(12) United States Patent
Scott et al.

(10) Patent No.: US 11,625,371 B2
(45) Date of Patent: Apr. 11, 2023

(54) AUTOMATED AUDIT BALANCE AND CONTROL PROCESSES FOR DATA STORES

(71) Applicant: T-Mobile USA, Inc., Bellevue, WA (US)

(72) Inventors: Jeffrey Scott, Bellevue, WA (US); Venkata Reddy Donthireddy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/480,799

(22) Filed: Sep. 21, 2021

(65) Prior Publication Data
US 2022/0004529 A1 Jan. 6, 2022

Related U.S. Application Data

(62) Division of application No. 16/237,593, filed on Dec. 31, 2018, now Pat. No. 11,157,469.

(51) Int. Cl.
*G06F 16/215* (2019.01)
*G06F 16/22* (2019.01)
*G06F 16/25* (2019.01)

(52) U.S. Cl.
CPC ........ *G06F 16/215* (2019.01); *G06F 16/2282* (2019.01); *G06F 16/254* (2019.01)

(58) Field of Classification Search
CPC .. G06F 16/215; G06F 16/2282; G06F 16/254; G06F 16/22; G06F 16/25; G06F 16/21; G06F 16/217
See application file for complete search history.

(56) References Cited

U.S. PATENT DOCUMENTS

| | | | |
|---|---|---|---|
| 8,688,625 B1 | 4/2014 | Clark et al. | |
| 10,394,691 B1* | 8/2019 | Cole | G06F 11/079 |
| 2006/0235715 A1 | 10/2006 | Abrams et al. | |
| 2009/0287628 A1 | 11/2009 | Indeck et al. | |
| 2013/0055042 A1 | 2/2013 | Al Za'noun et al. | |
| 2013/0226624 A1 | 8/2013 | Blessman et al. | |
| 2014/0310231 A1* | 10/2014 | Sampathkumaran | G06F 16/254 707/602 |
| 2014/0324645 A1* | 10/2014 | Stiffler | G06Q 40/12 705/30 |
| 2016/0070725 A1 | 3/2016 | Marrelli et al. | |

(Continued)

*Primary Examiner* — Wilson Lee
(74) *Attorney, Agent, or Firm* — Perkins Coie LLP (57) ABSTRACT

Systems and methods are described herein for performing automated audit balance control (ABC) procedures for data that has moved between data stores within an enterprise or other organization. The systems and methods inspect the data at a target data store and determine the quality of the movement of the data to the target data store based on the inspection. For example, the systems and methods can inspect row or record counts for the data in a data store, aggregate numeric sums within the data at the target data store, perform key data value comparisons between different locations that contained the data, perform full data comparisons between different locations that contained the data, perform checksum comparisons, apply complex business rules, and so on, when determining or verifying the completeness and accuracy of data as it arrives to a temporary or permanent location.

20 Claims, 4 Drawing Sheets

(56) References Cited

U.S. PATENT DOCUMENTS

| | | |
|---|---|---|
| 2016/0378752 A1* | 12/2016 | Anderson ........... G06F 16/2255 707/747 |
| 2018/0284744 A1 | 10/2018 | Celia et al. |
| 2019/0171187 A1 | 6/2019 | Celia et al. |
| 2020/0065405 A1 | 2/2020 | Gandenberger et al. |
| 2020/0193234 A1 | 6/2020 | Pai et al. |
| 2020/0287814 A1 | 9/2020 | Zhao |

* cited by examiner

AUTOMATED AUDIT BALANCE AND CONTROL PROCESSES FOR DATA STORES

CROSS-REFERENCE TO RELATED APPLICATIONS

This application is a division of U.S. patent application Ser. No. 16/237,593, filed Dec. 31, 2018, entitled AUTOMATED AUDIT BALANCE AND CONTROL PROCESSES FOR DATA STORES, which is hereby incorporated by reference in its entirety.

BACKGROUND

In a large enterprise, data is often stored in a data warehouse (DW), which acts a central repository that contains integrated data from multiple different data sources of the enterprise. Data moves from these disparate sources (e.g., operational systems, such as marketing or sales systems) into the data warehouse, which is accessed by various reporting and analysis systems.

Generally, ETL (extract, transform, load) processes perform the movement of data from the sources to the data warehouse, because the data moves from a source (the operation system source) into a target (the data warehouse), where the data stored at the target is in a different format or otherwise differs from the data at the source. Thus, the ETL processes function, often in parallel, to (1) extract the data from its source, (2) transform the data (e.g., into a form compatible with the target), and (3) load the data into the target.

Often, the data will move through various temporary data stores before being loaded into a final target data store. For example, ETL processes can move data from the initial operational system sources to an operational data store, the data warehouse, various data marts, Business Intelligence (BI) systems, Analytics systems, information portals, and so on. Thus, the ETL processes function to move data from various sources into and out of data stores within the enterprise.

As can be expected, moving large amounts of enterprise data (e.g., 1,000,000+ files or records) via processes running in parallel can lead to data being corrupted, missing, or malformed, as well as data movement jobs failing or not performing optimally due to various system, process, or resource issues.

Although there are various solutions for determining the quality of data residing in a data store, all suffer from various drawbacks. For example, there are numerous governing bodies that assert processes, controls, and procedures to assure the quality of data (e.g., DAMA, or The Global Data Management Community). In addition, there are various tools that can be used to check the quality of data through discovery, targeted inquiry, error handling, data cleansing, data standardization, and data relationship analysis. However, none of these tools enable an enterprise to efficiently and effectively determine the quality of data in its data stores, such as data that has moved between data stores during running ETL processes.

BRIEF DESCRIPTION OF THE DRAWINGS

Embodiments of the present technology will be described and explained through the use of the accompanying drawings.

The drawings have not necessarily been drawn to scale. Similarly, some components and/or operations can be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments or implementations described. On the contrary, the technology is intended to cover all modifications, equivalents, and alternatives falling within the scope of the technology as defined by the appended claims.

DETAILED DESCRIPTION

Overview

Systems and methods are described herein for performing automated audit balance control (ABC) procedures for data that has moved between data stores within an enterprise or other organization. The systems and methods inspect the data at a target data store and determine the quality of the movement of the data to the target data store based on the inspection.

For example, the systems and methods (collectively, "systems") can perform many operations, including: inspect row or record counts for the data in a data store; aggregate numeric sums within the data at the target data store; perform key data value comparisons between different locations that contained the data; perform full data comparisons between different locations that contained the data; perform checksum comparisons; apply complex business rules, and so on. These operations can be performed when determining or verifying the completeness and accuracy of data as it arrives at a temporary or permanent location.

The systems utilize such a level of inspection, computation, and/or comparison of data upon movement into a data store for certain environments (e.g., enterprise data warehouses, Business Intelligence (BI) systems, analytics systems, machine learning (ML) systems) where many varying forms of data are utilized as comprehensive data assets. For example, the systems manage data in the form of textual, numeric, geospatial, metadata, personal, images, media, streaming content, and so on, as well as the locations of the data creation, data transport or transmission, data storage, and data manipulations.

Therefore, the systems inspect the data after movement of the data into a target data store in order to mitigate against issues, errors, and/or inconsistencies due to the complexity of moving many large sources of disparate data around an enterprise. While general data quality tools can provide insights into the quality of data across many dimensions of quality, none provide a comprehensive tool, procedure, framework, process constructs, and/or criteria to control data and assure the completeness, accuracy, and timeliness of the data during and after data movement into data stores.

Further, by providing a level of confidence in the completeness and/or accuracy of a data store, other systems and data consumers in an organization can rely on the data store as a reliable input into their processes. For example, various business systems such as BI systems, sales analytics systems, finance systems (e.g., banking or accounting systems), and so on rely on data stores to be accurate, because these business systems generate reports, perform analytics, make business determinations, and perform other actions related to the data. Errors in the data store can lead to inaccurate or misleading reports or other information, which can cause an organization (via its business systems) to suffer from penalties due to such inaccuracies in the data. Thus, the data quality of a data store directly impacts these business systems that rely on the data store, as well as the enterprises and organizations that implement the business systems.

In some implementations, the present systems provide a user interface (e.g., a web portal via a browser or pages in a mobile application), which facilitates users (e.g., system administrators or developers) to create automated audit, balance, flow control procedures for selected data stores or sets of data. The user interface (or other components) can also generate notifications for 1) data quality problems identified by the ABC processes and 2) concerning the movement of data into or within different data stores.

Thus, the systems described herein provide various enhancements to ABC procedures. First, automated ABC processes can assure the integrity, completeness, accuracy, timeliness, and/or availability of high-quality data as the data is moved from one storage location to another storage location within a data store or between data stores, or as the data is transformed from one format or structure to another in complex data processing environments.

Second, the automated ABC processes can capture and save the results of various quality checks for use in analytics, in order to better understand the sources of data quality problems. The automated ABC processes provide and support different levels or service and/or inspection, enabling users to tailor or apply default support levels for most ABC processes and data validations (DV), while applying higher, more rigorous, levels of quality checks when suitable. Further, the automated ABC processes can leverage ABC information and/or data validation results to streamline remediation workflows or predict patterns of organizational behavior that cause data quality problems in the future. In doing so, the present system can thereby help enable "what if" and "cause/effect" analyses for improved, pre-emptive decision making, among other benefits.

In the following description, for the purposes of explanation, numerous specific details are set forth in order to provide a thorough understanding of embodiments of the present technology. It will be apparent, however, that embodiments of the present technology can be practiced without some of these specific details.

Examples of Suitable Computing Environments

As described herein, in some embodiments, the systems inspect data at a target or end data store and thereby determine the quality of the movement of the data to the target data store based on the inspection. The inspection includes the inspection of various group characteristics for the data in the data store, such as row counts, aggregated numeric sums, key data values representative of a set of data (e.g., customer identifiers, account numbers, SIM card data, phone numbers, certain sales data, and so on), checksums for sets of data, and various discrete data values. Thus, the systems can apply different levels of service or inspection to a data set, depending on requirements of an administrator or a requesting system.

Figure 1:
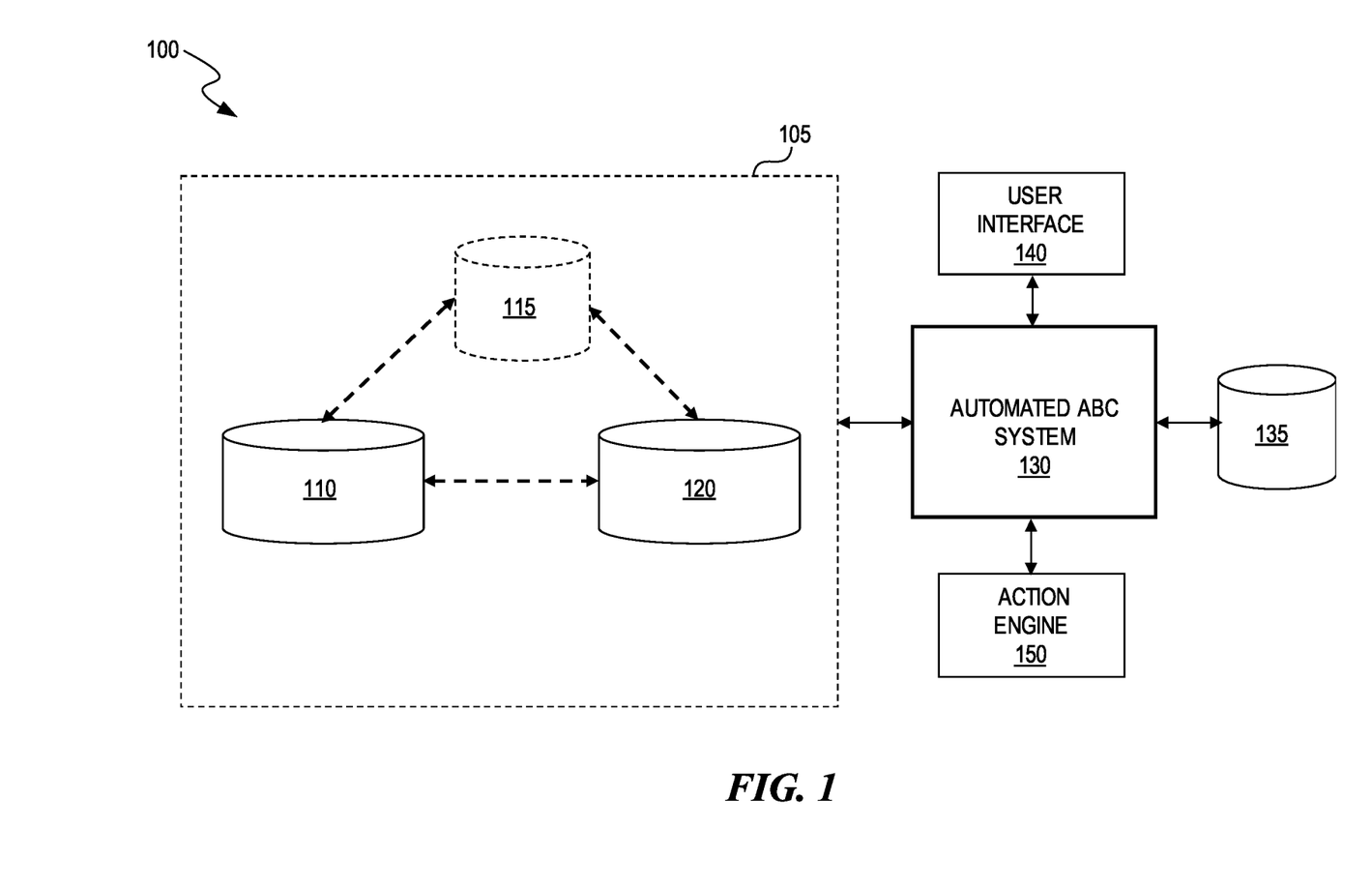
FIG. 1 is a block diagram illustrating a suitable computing environment for performing automated audit balance control (ABC) processes on data stores within an enterprise.

FIG. 1 is a block diagram illustrating a suitable computing environment 100 for performing automated audit balance control (ABC) processes on data stores within an enterprise. An enterprise 105 can include disparate data stores, such as data store 110, data store 115, and data store 120. As depicted, any of the data stores can be a source data store, a target data store, a temporary or intermediate data store, and so on.

For example, data can move from the data store 110 (acting as a source data store) to the data store 120 (acting as a target data store), where a data path is a direct movement of data from the data store 110 to the data store 120.

As another example, data can move from the data store 110 to the data store 120 via the data store 115, where data store 115 acts as a temporary data store for the data along a data path of movement that includes a temporary storage of data at the data store 115 before moving to the data store 120.

As described herein, the data stores 110, 115, and 120 can be part of a variety of different databases within an enterprise. For example, the data store 110 is part of an operational system database (e.g., a marketing or finance database) that stores operational data, while the data store 120 is part of a data warehouse or data lake (which stores raw data in any native format). The data stores can be part of other systems, such as Business Intelligence (BI) systems, analysis systems, machine learning (ML) or artificial intelligence (AI) systems, and so on. Further, the data stores can be part of a single database (e.g., data store 110 and 115 are part of a single operational system database) or discrete databases.

Various processes can manage or control the movement or transfer of data between data stores (e.g., from data store 110 to data store 120). As described herein, extract, transform, and load (ETL) processes often manage the transfer of data between data stores, such as data moving to a data store that stores the data in a format different from a source data store.

Such processes can be performed in parallel and operate to move large amounts of data (e.g., 1,000,000+ files) in one format (e.g., a flat file format) from one data store to another, eventually loading the data to the target data store in a different format (e.g., a relational format). As an example, ETL processes can control and manage the movement of data from a flat file database to a Hadoop data lake to a SQL database or Oracle database, among other destinations.

As described herein, automated audit balance and control (ABC) processes provide enterprises with robust and enhanced techniques for determining the quality of data at a target or destination data store, after data is moved from a source data store. The enterprise includes an automated ABC system 130 configured to perform various data or data store inspection operations when determining the quality of data contained in a data store.

The framework for the automated ABC system 130 is based on the audit, balance, and control processes. The audit feature of the system 130 schedules ETL functions and manages jobs that run to move data between data stores. Further, the audit feature manages and/or tracks job start and end times, the number of transferred records or files, and so on. The balance feature compares the data in the source data store with data that is loaded into a target data store, and applies various rules to the processes. The control feature oversees operations, scheduling jobs, restarting jobs, ending jobs, and so on.

As described herein, the automated ABC system 130 performs various inspection or data check operations before, during, or after data moves between data stores. Further, the system 130 inspects data at a group characteristic or dataset parameter level. For example, instead of comparing data objects in one data store to the data objects in a second data store, the system 130 inspects characteristics of the entire set of objects (or portions of the set). The system 130, as described herein, inspects and compares row counts (e.g., how many rows are in a data store), aggregated numeric sums, checksums, and so on, that represent an entire set or group of data that has moved from one data store to another data store.

By inspecting data stores for group or set characteristics, the automated ABC system 130 can perform two different types of inspection in combination with one another. First, the system 130 can compare and identify differences (e.g., errors or inconsistencies) in a set of data across an entire path of movement from a source data store to a target or destination data store. Second, the system 130 can also compare and identify the differences in the data set at any point along the path of movement (e.g., at any intermediate or temporary data store). Thus, the system 130 can provide insight as to data quality at two different levels of inspection, a level that determines a change in data quality across an entire path, and a level that determines a change in data quality as the data moves across the path.

In some implementations, the system 130 includes a user interface 140, which enables a user (e.g., a developer or system administrator) to manage operations of the system 130. The user interface 140 can be supported and/or provided via a web portal or mobile application, and facilitates the input of information from a user, as well as the export or presentation of information to the user. For example, the interface can facilitate user selection of levels of inspection, such as what characteristics to utilize when comparing data at different data stores, user selection of data quality thresholds, and user selections of reporting or other performed actions (all of which could be performed through the use of web forms).

Similarly, the user interface 140 can provide a user with reports and other information associated with an audit or data validation (DV) performed on a set of data at a data store. The information can present various data quality metrics or assignments, including percentages that reflect the quality of the data, as well as other information that identifies errors or issues within the data set or the path of movement to the data store. For example, the user interface 140 can present a user with an interactive graphic that depicts (and provides detailed information) data quality metrics at each point (e.g., data store) along a data path to a target data store (as well as an overall comparison of the data quality from source data store to target store).

To facilitate the generation of reports and other information presentations, the automated ABC system 130 can include a results database 135 that stores or manages the results of ABC and DV processes performed on data stores. The database 135 includes various types of information, including determined data quality metrics, analysis results for comparisons of data during movement along a data path, and so on.

Further, the automated ABC system 130 interacts with an action engine 150, which performs various actions in response to determinations of data quality and other metrics for a set of data at a data store. For example, the action engine 150 can perform an action to provide input to processes configured to mitigate or correct errors in a data store, can perform an action to provide data quality metric information or assessments to various enterprise systems (e.g. Business Intelligence systems, finance systems, compliance systems, and so on), can perform an action to send a notification, an alert, and/or flag a data store when the data store is assigned a low data quality metric by the system 130, and so on.

Further details regarding the automated ABC system 130, its components, and its functionality are provided herein.

FIG. 1 and the discussion herein provide a brief, general description of a suitable computing environment in which the automated ABC system 130 can be supported and implemented. Although not required, aspects of the computing environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," are generally used interchangeably herein, as are "mobile device" and "handset," and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the environment (e.g., the transfer of data between data stores or the access of data stores by the system 130) can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or another scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over a communications network. In some cases, the telecommunication network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Examples of Inspecting Data During Audit Balance Control Operations

Figure 2:
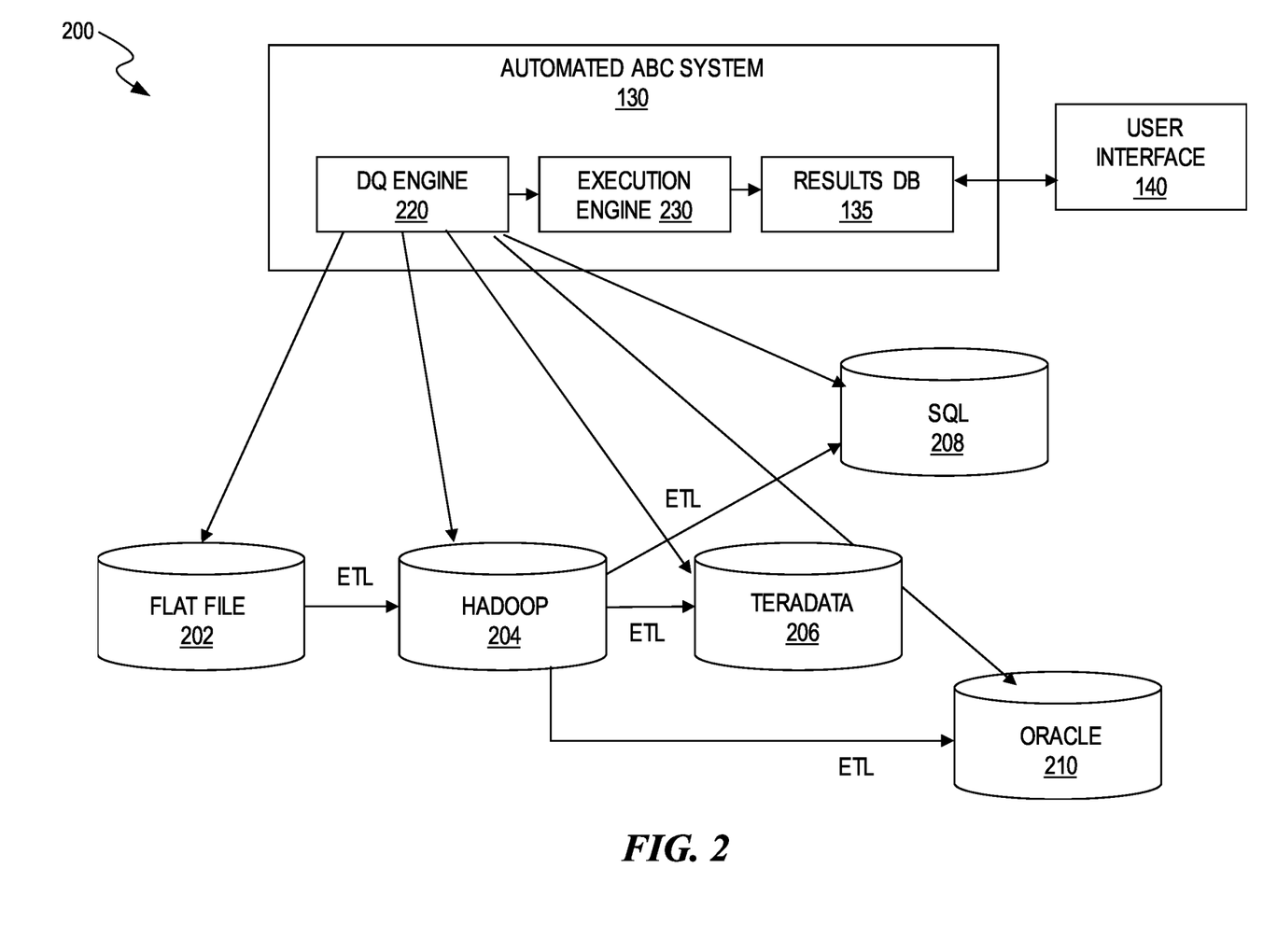
FIG. 2 is a block diagram illustrating various components of an automated ABC system.

As described herein, in some implementations, the automated ABC system 130 facilitates the inspection and subsequent determination of the quality of data contained in a data store based on group or representative characteristics of the data within the data store. FIG. 2 is a block diagram 200 illustrating various components of the automated ABC system 130.

The automated ABC system 130 includes a data quality engine 220, such as a data audit tool provided by Ataccama, Inc., and implemented via a web service (e.g., EC2 from AWS). The data quality engine 220 is configured to access various data stores 202-210, and check or inspect the data stores for various group characteristics, as defined the system 130 and/or a user via the user interface 140.

For example, within an enterprise, data moved (via ETL processes) from a flat file database 202 to a Hadoop system 204 or environment, which can store the data in NoSQL distributed databases and otherwise provide for large amounts of data storage. The data then moved, via ETL processes, from the Hadoop system 204, to various relational databases, such as a Teradata database 206, an SQL database 208, and/or an Oracle database 210. Of course, the data can move to different data stores other than those depicted in FIG. 2, such as other data stores of data warehouses, data lakes, BI systems, and so on.

The data quality engine 220 access the various databases (or data stores) in order to inspect the data contained therein for certain group or representative characteristics, such as row counts and others described herein. The data quality engine 220 provides an execution engine 230 with information about the data within the databases 202-210, which performs comparisons to determine data quality metrics for the data in the various locations.

The execution engine 230 transfers the results of various comparisons to the results database 135, which stores the results. The user interface 140 access the database 135, presenting information regarding the determined data quality for the data at different locations across the databases 202-210.

Figure 3:
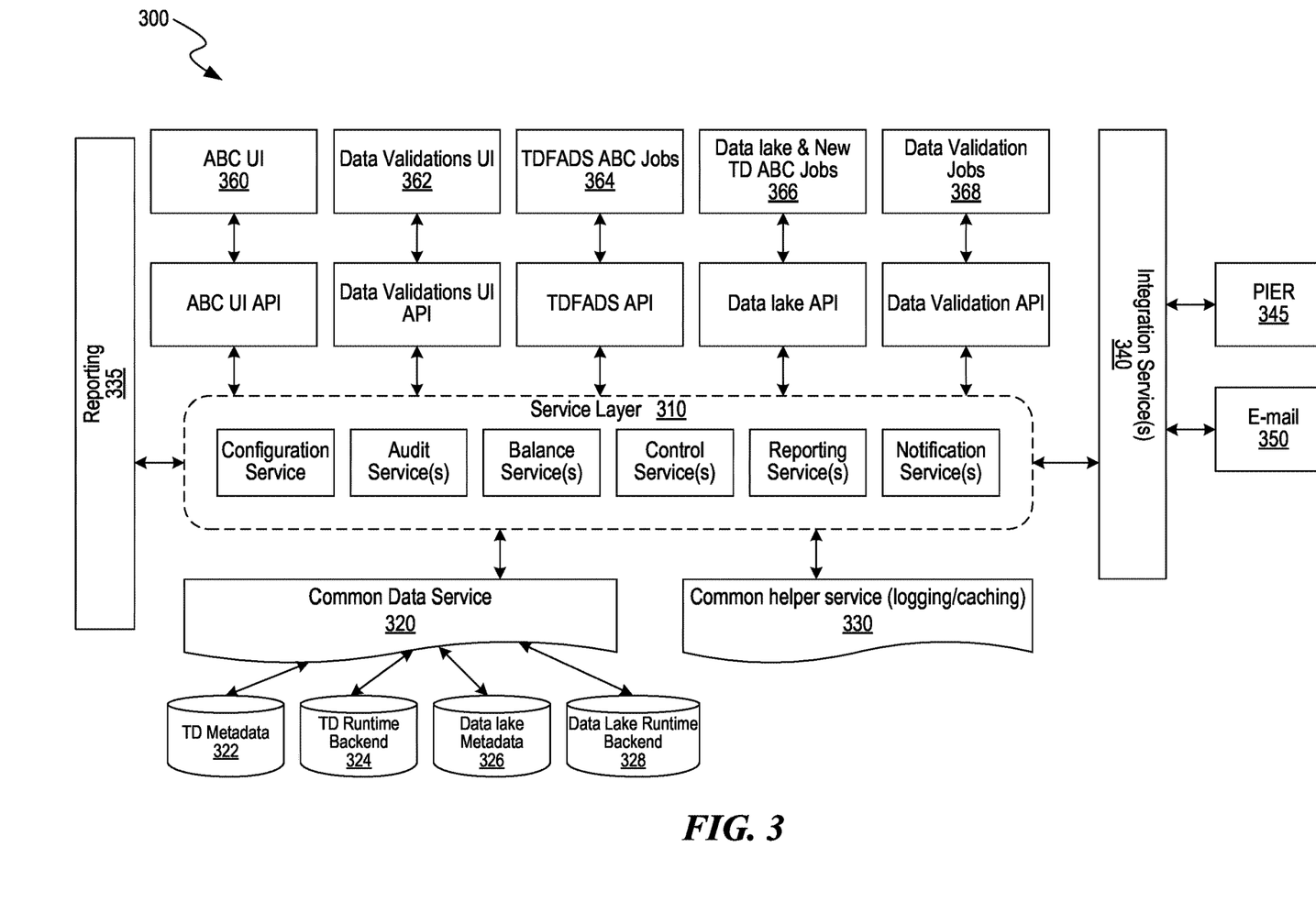
FIG. 3 is a block diagram illustrating an example architecture for a data quality portal associated with an automated ABC system.

FIG. 3 is a block diagram illustrating an example architecture 300 for a data quality portal associated with the automated ABC system 130. The architecture 300 for the portal is implemented, in part, via the user interface, such as via a web service (e.g., AWS).

The automated ABC system 130 includes a service layer 310, which performs various ABC services, as described herein. For example, the service layer 310 facilitates the performance of configuration services, audit services, balance services, control services, reporting services, notification or alert services, and so on.

The service layer 310 communicates with a common data service 320, which acts to store and manage data for the business application, such as data in data stores 322-328. For example, the data stores include a metadata data store 322, a runtime data store 324, a data lake metadata data store 326, and a data lake runtime data store 328. The service layer 310 also communicates with a common helper service 330, which assists with the logging and caching of data for the service layer 310.

The service layer 310 communicates with a reporting layer 335, which generates and presents reports associated with ABC processes for the data. Further, the service layer 310 communicates with various integration services 340, as described herein. For example, the integration service 340 can utilize email services 350 to send notifications and perform other actions, as well as a PIER service 345. PIER is an enterprise trouble ticket tracking system, used to capture various forms of problems or issues with data, technical infrastructure, computers, or services available from Information Technology and other technical teams within an organization.

Various user interfaces 360-368 of the portal can access data quality metrics and other determinations via published APIs (Application Programming Interfaces) associated with the service layer 310. For example, the portal includes an ABC UI 360 for accessing ABC data and information, a Data Validation (DV) UI 362 for accessing data validation information, a TDFADS ABC Jobs U 1364 for accessing job data for staged, running, and/or performed ABC jobs, a data lake ABC Jobs UI 366 for accessing data lake jobs information, and a DV Jobs UI 368 for accessing DV jobs information. As depicted, the TDFADS ABC Jobs UI 364 includes a UI associated with a Financial Analytics Data Store deployed on a Teradata database platform. It stores data for use in reports, analytics, and metrics required by business units such as Finance, Sales, Marketing, etc., for use in making operational decisions or in reporting financial metrics.

Thus, the data quality portal, managed by the service layer 310, implements various aspects of the automated ABC system 130. The system 130, as implemented in FIG. 2 or FIG. 3, includes various components or modules for determining the quality of data at a data store. These components include a data access module that accesses a source data store that previously contained data and a target data store that currently contains the data, where the data moved from the source data store to the target data store via extract, transform, and load (ETL) processes performed on the data.

Further, the system 130 can include a data inspection module that checks one or more group characteristics for the data contained in the target data store, where the check of the one or more group characteristics includes a comparison of a value assigned to a group characteristic (e.g., a number of row counts) for the data when currently contained in the target data store to a value assigned to the group characteristic for the data when previously contained in the source data store. Also, the system 130 includes a data quality module that determines a quality of the data in the target data store based on the check of the one or more group characteristics for the data contained in the target data store.

In some implementations, the system 130 checks the one or more group characteristics for the data contained in the target data store by determining the value assigned to the group characteristic for the data when previously contained in the source data store before movement of the data from the source data store to the target data store and then determining the value assigned to the group characteristic for the data when currently contained in the target data store after the movement of the data from the source data store to the target data store.

data sources each previously contained a portion of the data currently contained by the target data store, and the system 130 compares the collection of source data stores to the target data store when determining errors or other issues within the data.

In some embodiments, the system 130 facilitates the inspection of data at different levels of review or scrutiny. For example, a user may input a preferred inspection level for certain types of data via the user interface 140, and the system 130 performs comparisons of certain group characteristics that match the requested level of service. The following table provides some example guidelines for applied service levels (e.g., with level 1 being the highest level and level 3 being, in some cases, a default level of service):

TABLE 1

| Process | Category | Level 1 | Level 2 | Level 3 | Level 4 | Level 5 |
|---|---|---|---|---|---|---|
| ABC | Audit type | Row count Summed numeric field | Row count Summed numeric field | Row count Summed numeric field | Row count Summed numeric field | Row count |
| DV | Validation Checks | Metadata Pattern Business Rules Relationships Statistics | Metadata Pattern Business Rules Relationships | Metadata Pattern Business Rules | Metadata Pattern | Metadata |
| ABC | Balance | Unreconciled Row Count Unreconciled Summed numeric field Mismatched Records or Data | Unreconciled Row Count Unreconciled Summed numeric field Mismatched Records or Data | Unreconciled Row Count Unreconciled Summed numeric field Mismatched Records or Data | Unreconciled Row Count Unreconciled Summed numeric field | Unreconciled Row Count or Data |
| ABC DV | Balance Threshold Failure Threshold | ≤0.1% | ≤0.99% | ≤1-2.99% | ≤3-4.99% | ≥5% |
| ABC DV | Control Action Failure Action | Pause for Inspection | Pause for Inspection | Pause for Inspection | Fail | Fail |
| ABC DV | Control Notification Failure Notification | Escalation PIER Ticket Email | Escalation PIER Ticket Email | PIER Ticket Email | Email | Email |
| ABC DV | Run Frequency | Streaming | Intraday | Daily | Weekly | Monthly Quarterly On Demand |
| ABC DV | Volume | <5,000 | <10,000 | <100,000 | <10,000,000 | >10,000,000 |

Further, as described herein, the system 130 facilitates the inspection of many different data stores within or along a path of movement of data from a source data store to a target data store. Thus, the system 130 can access a temporary data store located in a data movement path between the source data store and the target data store that contained the data after the data was previously contained at the source data store and before the data moved to the target data store. Then, the system 130 performs a comparison of the value assigned to the group characteristic for the data when currently contained in the target data store to the value assigned to the group characteristic for the data when previously contained in the source data store and a value assigned to the group characteristic for the data when contained in the temporary data store.

Also, as described herein, the system 130 can perform comparisons between multiple source data stores and multiple target data stores. For example, two or more disparate Thus, as shown in Table 1, a level 1 service review can be applied to small amounts of records and is configured to determining small threshold error percentages of data in a data store, while a lower importance review (e.g., level 4 or 5) can handle large batches of data and tolerate higher numbers of issues.

Further, as described herein, the different functions can be defined as follows:

An audit includes logging of row counts and summed numeric columns, and can be used to provide visibility into the successes and errors that occur as data is moved (as well as to data at rest as a reconciliation);

The balance is a comparison of row counts, summed numeric columns, and data values from one layer or data store to another to identify matches and errors in the data movement;

Control includes a flow of the data that can be controlled based on an auditable value and/or other thresholds.

Control can include an action against the process or a notification upon a pass/fail determination of the process;

A data valuation, or DV, includes a valuation of the data's adherence to specific requirements during, after, or independent of, process execution;

Patterns identify data deviations from what is expected in the data. Patterns are typically strings of alphabetic and/or numeric characters and character types which are indicative of types of data. Examples include (1) US phone numbers may adhere to a pattern: "(nnn) nnn-nnnn", where n is a numeric character between 0 and 9 and "(", ")", and "-" are specific characters, (2) Social security numbers may adhere to a pattern: "nnn-nn-nnnn" where n is a numeric character between 0 and 9, (3) In the past, Washington state driver's license numbers adhered to the pattern: "aa-aa-aa-annnan", where x is an alphabetic character in the English alphabet, n is a numeric character between 0 and 9, and the first 2 numeric characters in the driver's license number form a number equal to 100 minus the 2 least significant digits of the individuals' birth year, and so on;

Statistics include various statistical measures applied to data values, including: Maximum length of data in a field, Minimum length of a value in a field, Average value of data in a field, Distribution of occurrences of specific values in a field (could be quantiles, or exact distribution values), and so on;

Business Rules are checks that indicate data is not conforming to rules such as data cardinality, data types, domains of values, and so on. Examples include invalid dates or postdated transactions which are not valid in specific business scenarios, amounts where the data has alphabetic characters, true or false indicators that have no value or something other than true or false. Further, the checks may indicate a SKU for the wrong type of item, color, and so on;

Relationships are directed to data having dependencies on other data, but the dependent value does not exist or is invalid. Examples include Order Line Items without an Order Header, sales at an undefined or invalid store location, and so on;

The run frequency defines an interval that the process is scheduled to run;

A failure threshold identifies a percentage or count of the number of records that can fail before control is exercised;

A control action is a specific action implemented (and performed) in the event of process failure; and A failure notification includes notifications by which interested parties are notified of process failures or other events.

Table 2 presents service level tiers for the different processes identified in the guidelines of Table 1.

TABLE 2

| Service | Level 1 | Level 2 | Level 3 |
| --- | --- | --- | --- |
| Audit | Full record compare Aggregate Numeric Sum Row Count | Aggregate Numeric Sum Row Count | Row Counts |
| Balance | Mismatched records or data Unreconciled Sum of Numeric field Unreconciled Row Count | Unreconciled Sum of Numeric field Unreconciled Row Count | Unreconciled Row Count |

TABLE 2-continued

| Service | Level 1 | Level 2 | Level 3 |
| --- | --- | --- | --- |
| Control | Pause Job to allow inspection | Pause Job to allow inspection | Fail |
| Threshold | 99.9% | 99% | 95% |
| Error handling and Metadata | Error Record Capture Error Detail Log Error Summary Log | Error Detail Log Error Summary Log | Error Summary Log |
| Notification Validation | Escalation Range/Domain Complex Business Rules Referential Integrity Nulls Data Types | Trouble Ticket Referential Integrity Nulls Data Types | Email Nulls Data Types |
| Reconcile | Source to Report Source to Core Layer to Layer | Source to Core Layer to Layer | Layer to Layer |

Thus, as described herein, the automated ABC system 130 can perform various service levels of inspection, depending on the type of data, the amount of data, the tolerance for errors or other issues, and so on.

Figure 4:
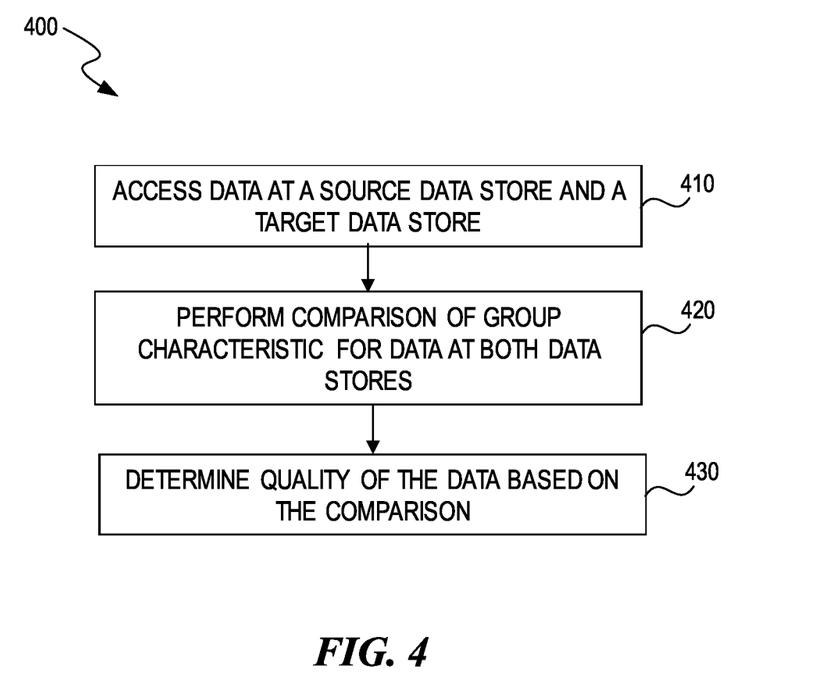
FIG. 4 is a flow diagram illustrating a method for performing an automated ABC process on data that has moved from a source data store to a target data store.

As described herein, the system 130 performs various operations when managing or controlling the movement of data between data stores of an enterprise. FIG. 4 is a flow diagram illustrating a method 400 for performing an automated ABC process on data that has moved from a source data store to a target data store. The method 400 can be performed by the system 130 and, accordingly, is described herein merely by way of reference thereto. It will be appreciated that the method 400 can be performed on any suitable hardware or device.

In operation 410, the system 130 accesses a source data store that previously contained a set of data and a target data store that currently contains the set of data. For example, the system 130 accesses the data after the data moved from the source data store to the target data store via extract, transform, and load (ETL) processes performed on the data.

In operation 420, the system 130 compares a data group characteristic (e.g., row count) for the set of data when currently contained in the target data store to a data group characteristic for the set of data when previously contained in the source data store. For example, the system 130 determines a row count for the set of data when previously contained in the source data store before commencement of the ETL processes performed on the data, and determines the row count for the set of data when currently contained in the target data store after completion of the ETL processes performed on the data.

In operation 430, the system 130 determines a quality of the set of data in the target data store based on the comparison of the characteristic for the set of data when currently contained in the target data store to the characteristic for the set of data when previously contained in the source data store. For example, following Table 2, if the data quality is determined to be at 93% (the row counts have a 93% match percentage) during a service level 3 inspection, the system 130 automatically generates an email notification to an administrator.

Thus, the system 130 facilitates the audit and validation of data quality during data movement between data stores. For example, the system can perform an extract, transform, and load (ETL) process on a set of data contained in the source data store to move the set of data from the source data store to the target data store, determine a quality of the set of data in the target data store based on a comparison of a row count for the set of data when contained in the target data store to a row count for the set of data when contained in the source data store, and perform an action based on the determined quality of the set of data in the target data store. Thus, in some implementations, the system 130 is part of an integrated data movement and ABC operation that constantly or periodically monitors data as it moves between data stores, layers, or other points along data paths from sources to targets.

As described herein, the system 130 can perform such operations in a variety of scenarios. As a first scenario, a developer can utilize the system 130 when data is moved (via ETL) between various data stores, changing formats from one data store (e.g., the flat file database 202 of FIG. 2) to another data store (e.g., a Hadoop database 204) and then to a final data store (e.g., the SQL database 208). Depending on the data quality at the various data stores, the system 130, using the information in Table 2, can perform actions to notify the developer or other systems integrated with the data stores.

As a second scenario, SKU data for an inventory data source moves to a new data store. The system 130 performs a comparison of row counts and identifies thousands of unclassified SKU data related to millions of dollars of inventory. The system 130, based on the comparison, sends a notification regarding the unclassified SKU data, in order to reconcile the money associated with the erroneous SKU data identified by the system 130.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

Certain aspects of the technology are presented below in certain claim forms to reduce the number of claims, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of auditing data moving from a source data store to a target data store, the method comprising:

performing an extract, transform, and load (ETL) process on a set of data contained in the source data store to move the set of data from the source data store to the target data store;

inspecting one or more group characteristics of the set of data,
wherein the group of characteristics comprises one or more of: row count of the set of data, aggregated numeric sums of the set of data, key data values representative of the set of data, or checksums derived from the set of data;

accessing a temporary data store located in a data movement path between the source data store and the target data store that contained the data after the data was previously contained at the source data store and before the data moved to the target data store,
wherein the one or more group characteristics of the set of data are inspected while the set of data is stored at the temporary data store;

determining a quality of the set of data in the target data store based on the inspected one or more group characteristics; and performing an action based on the determined quality of the set of data in the target data store.

2. The method of claim 1, wherein the group characteristics are selected based on requirements of an administrator or a system requesting to move the set of data from the source data store to the target data store.

3. The method of claim 1, wherein the one or more group characteristics of the set of data are inspected before the set of data is moved from the source data store to the target data store.

4. The method of claim 1, wherein the one or more group characteristics of the set of data are inspected after the set of data is moved from the source data store to the target data store.

5. The method of claim 1, further comprising:
determining a level of scrutiny associated with the set of data,
wherein the one or more group characteristics to be used for the inspection are selected based on the level of scrutiny associated with the set of data.

6. The method of claim 1, wherein the source data store that previously contained the data includes two or more disparate data sources that each previously contained a portion of the data currently contained by the target data store.

7. The method of claim 1, wherein the source data store that previously contained the data stored the data in a flat file format, and wherein the target data store that currently contains the data stores the data in a relational table format.

8. The method of claim 1, further comprising:
determining that the quality of the data in the target data store is below a threshold level of quality for the set of data,
wherein the performed action comprises correcting errors with the set of data in response to the determination that the quality of the data is below the threshold level of quality for the set of data.

9. The method of claim 1, wherein the performed action comprises generating a report based on the determination of the quality of the data.

10. The method of claim 1, wherein the source data store is part of a first database, and wherein the target data store is part of a second database different from the first database.

11. The method of claim 1, wherein the source data store is part of an operational system database of an enterprise and wherein the target data store is part of a data warehouse for the enterprise.

12. The method of claim 1, wherein the source data store is part of a data warehouse for an enterprise, wherein the data warehouse includes a data lake, and wherein the target data store is part of a business intelligence system for the enterprise.

13. The method of claim 1, wherein the source data store and the target data store are both part of a single database within an enterprise.

14. The method of claim 1, further comprising:
determining a row count for the set of data when previously contained in the source data store before commencement of the ETL processes performed on the data; and
determining a row count for the set of data when currently contained in the target data store after completion of the ETL processes performed on the data,
wherein determining the quality of the set of data in the target data store comprises: comparing the row count for the set of data when currently contained in the target data store to the row count for the set of data when previously contained in the source data store.

15. The method of claim 1, wherein determining the quality of the set of data in the target data store comprises: comparing an aggregated numeric sums for the set of data when contained in the target data store to an aggregated numeric sum for the set of data when contained in the source data store.

16. A non-transitory, computer-readable medium whose contents, when executed by a computing system, cause the computing system to perform a method of auditing data moving from a source data store to a target data store, the method comprising:
performing an extract, transform, and load (ETL) process on a set of data contained in the source data store to move the set of data from the source data store to the target data store;
inspecting one or more group characteristics of the set of data,
wherein the group of characteristics comprises one or more of: row count of the set of data, aggregated numeric sums of the set of data, key data values representative of the set of data, or checksums derived from the set of data;
determining a quality of the set of data in the target data store based on a comparison of an aggregated numeric sums for the set of data when contained in the target data store to an aggregated numeric sum for the set of data when contained in the source data store; and
performing an action based on the determined quality of the set of data in the target data store.

17. The non-transitory, computer-readable medium of claim 16, wherein the method further comprises:
accessing a temporary data store located in a data movement path between the source data store and the target data store that contained the data after the data was previously contained at the source data store and before the data moved to the target data store,
wherein the one or more group characteristics of the set of data are inspected while the set of data is stored at the temporary data store.

18. The non-transitory, computer-readable medium of claim 16, wherein the method further comprises:

determining that the quality of the data in the target data store is below a threshold level of quality for the set of data, wherein the performed action comprises correcting errors with the set of data in response to the determination that the quality of the data is below the threshold level of quality for the set of data.

19. A system for performing audit balance and control (ABC) processes on data stored within data stores of an enterprise, the system comprising:

at least one hardware processor; and at least one hardware memory that is coupled to the at least one processor, wherein the at least one hardware memory stores software modules, wherein the at least one hardware processor is configured to execute the software modules, and wherein the software modules perform a method comprising:

performing an extract, transform, and load (ETL) process on a set of data contained in a source data store to move the set of data from the source data store to a target data store;

inspecting one or more group characteristics of the set of data, wherein the group of characteristics comprises one or more of: row count of the set of data, aggregated numeric sums of the set of data, key data values representative of the set of data, or checksums derived from the set of data;

determining a quality of the set of data in the target data store based on a comparison of an aggregated numeric sums for the set of data when contained in the target data store to an aggregated numeric sum for the set of data when contained in the source data store; and performing an action based on the determined quality of the set of data in the target data store.

20. The system of claim 19, wherein the software modules further perform a method comprising:

accessing a temporary data store located in a data movement path between the source data store and the target data store that contained the data after the data was previously contained at the source data store and before the data moved to the target data store, wherein the one or more group characteristics of the set of data are inspected while the set of data is stored at the temporary data store.

* * * * *